United States Patent [19]
Bristol

[11] 3,801,937
[45] Apr. 2, 1974

[54] ACOUSTIC PULSE COMPRESSION WEIGHTING FILTER TRANSDUCER
[75] Inventor: Thomas W. Bristol, Orange, Calif.
[73] Assignee: Hughes Aircraft Company, Culver City, Calif.
[22] Filed: Feb. 20, 1973
[21] Appl. No.: 334,175

[52] U.S. Cl. ................................ 333/72, 310/9.8
[51] Int. Cl. ............................................ H03h 9/00
[58] Field of Search ............... 310/9.8; 333/30 R, 72

[56] References Cited
OTHER PUBLICATIONS
de Klerk, "Ultrasonic Transducers 3 Surface Wave Transducers," Ultrasonics, Jan. '71, p. 35 & 48 relied on.

Primary Examiner—Paul L. Gensler
Attorney, Agent, or Firm—Robert H. Himes

[57] ABSTRACT

In order to improve the resolution of radar systems, one present practice is to interpose a pulse expansion filter in the transmitting channel of the radar system in conjunction with a pulse compression filter in the receiving channel whereby a longer pulse is transmitted than is applied to the detection apparatus of the system. When such a "pulse compression" system is used without weighting, the filter time sidelobe responses limit the resolution of adjacent targets to 13 decibels difference in amplitude. In accordance with the present invention, a class of unapodized nondispersive acoustic surface wave transducers is realized having spectral response functions that provide spectral weighting for time sidelobe reduction in pulse compression filters to extend the resolving power of a pulse compression radar system to as much as 43 decibels.

6 Claims, 4 Drawing Figures

Spectral Response

Impulse Response

Spectral Response for Different $f_o/BN_1$

ACOUSTIC PULSE COMPRESSION WEIGHTING FILTER TRANSDUCER

BACKGROUND OF THE INVENTION

The most commonly used compression line weighting techniques are the external spectral filter, apodization of the dispersive transducer, and apodization of the nondispersive input transducer. An external spectral filter performs adequately but is an extra component which is usually larger than the delay line employed. Internal weighting of the acoustic transducers eliminates this component.

Apodization of the dispersive grating is an optimum technique for short, small time bandwidth delay lines. Acoustic diffraction is severe in the region where the apertures are small, however, which limits the transducer lengths for which predictable performance can be obtained.

Apodization of the nondispersive input transducer is not acceptable unless the dispersive grating is unapodized in which case the device response can be predicted as the product of the respective transducer responses. In addition, acoustic diffraction again limits ultimate device performance.

Since the input transducer of the present invention is totally unapodized, acoustic diffraction is minimized whereby the device response is highly predictable thereby allowing the dispersive transducer to be optimized as an expansion filter for which minimum apodization is required.

SUMMARY OF THE INVENTION

The transducers of the present invention are designed to be used in conjunction with a dispersive expansion filter to form an internally weighted pulse compression filter. Accordingly, it is first necessary to select the spectral weighting function, H(f), to be employed. This may, for example, be what is commonly designated as a cosine-on-a-pedestal weighting function with the minimum points thereof enclosing one periodicity coinciding with the highest and lowest frequencies of the bandwidth, B, of the filter. The Fourier transform of the H(f) function constitutes a symmetrical impulse response at intervals of 1/B with the center impulse normally being the strongest. The weighting transducer of the present invention is then implemented by means of a multi-array periodic unapodized transducer with the respective arrays spaced 1/B wavelengths between centers along a piezo-electric substrate and the number of sources in each array being proportional to the strength of the respective impulse responses. A source is defined as being sinusoidally distributed between a pair of electrodes of opposite polarity in an array. The approximation of the impulse function is satisfactory when the bandwidths of the respective periodic arrays are large compared to the filter bandwidth, B. Lastly, the number of sources in the respective arrays of the multi-array transducer are made to be all odd or all even.

DESCRIPTION

Figure 1:
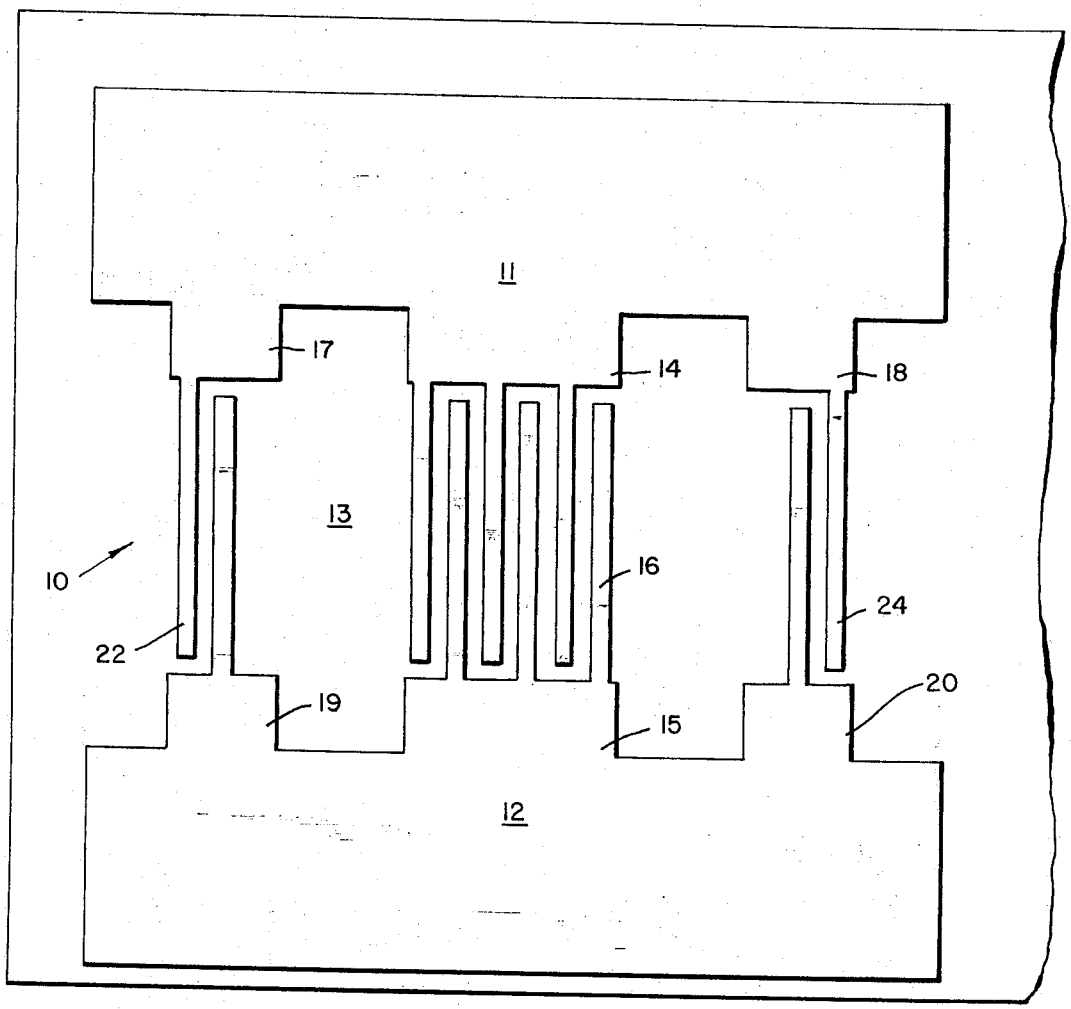
FIG. 1 shows the electrode layout of the multi-array unapodized periodic weighting transducer of the present invention.

Referring to FIG. 1, there is depicted an acoustic surface-wave transducer 10 for weighting a pulse compression filter of bandwidth, B, with a function H(f). Transducer 10 includes spaced parallel coextensive electrical pads 11, 12 disposed on a piezoelectric substrate 13 which is provided, for example, by Y-cut, Z propagating lithium niobate. Electrical pads 11, 12 have opposing pedestals 14, 15 in the central portion thereof, respectively, which connect to interleaved finger-shaped periodic unapodized electrodes which form a central array 16 having $N_1$ sources. In addition, electrical pad 11 has pedestals 17, 18 which flank centrally disposed pedestal 14 and are directly opposite pedestals 19, 20, respectively, from electrical pad 12. Pedestals 17, 19 and 18, 20 are spaced from pedestals 14, 15 to provide a delay $\tau = 1/B$ along the piezoelectric substrate 13 between the respective center lines thereof. Pedestals 17, 19 and 18, 20 connect to interleaved finger-shaped periodic unapodized electrodes to form flanking arrays 22, 24, respectively. The periodic spacing is, in each case, one-half wavelength at the mean frequency, $f_o$, of the bandwidth, B. Each of the flanking arrays 22, 24 have $N_2$ sources. $N_1$ and $N_2$ are integers which are both odd or are both even. Next, the ratio of $N_2/N_1$ is made to approximate the ratio of the magnitude of the side impulse to that of the center impulse of the time domain response, $h(t)$, of the spectral weighting function, H(f). Thus $N_1$ can be no less than 3 and $N_2$ can be no less than 1. This approximation to the impulse function, $h(t)$, is satisfactory so long as the number of sources in the arrays 16, 22, 24 is sufficiently small so that the bandwidth thereof is large compared to the filter bandwidth, B. Stated differently, this latter relationship may be defined as follows:

$$f_o/B N_1 \geq 1 \tag{1}$$

wherein $f_o$ is the mean frequency of the device. Thus, for example, if the mean frequency, $f_o$, is 10 MHz and the bandwidth 1.0 MHz, $N_1$, the number of sources in the centrally disposed array 16 should be ten or less.

Lastly, additional flanking arrays at the same spacing $\tau = 1/B$ from the arrays 22, 24 may be used to approximate additional terms of the time domain response, $h(t)$, of the spectral weighting function, H(f). In operation, it is the flanking arrays 22, 24 which generate outputs which are delayed in such a manner so as to cancel sidelobe energy developed by the sin $x/x$ energy distribution of a rectangular pulse waveform.

Figure 2:
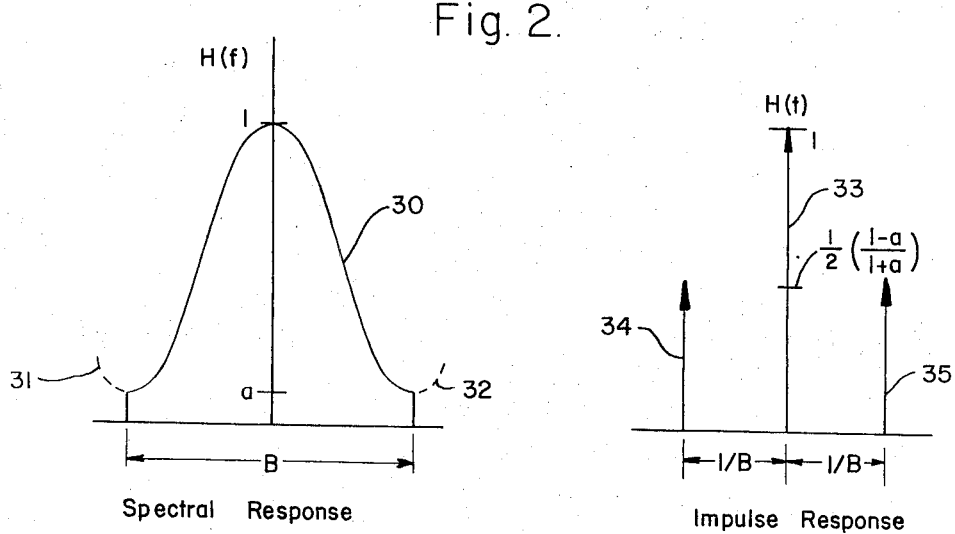
FIG. 2 illustrates the cosine-on-a-pedestal weighting function together with its Fourier Transform.

Referring to FIG. 2, there is illustrated the relationship between frequency and time domain response H(f) and h(t), respectively, of spectral cosine-on-a-pedestal weighting function having a pedestal height $a$. More particularly, when the pedestal $a$ of the cosine-on-a-pedestal function is of the order of 0.08, it is known as a "Hamming" function. Spectral response 30, FIG. 2, illustrates such a cosine-on-a-pedestal Hamming function wherein the highest point is normalized at 1 and the lowest points of height $a$ define the width of the pedestal which is designed to coincide with the bandwidth, B, of the pulse compression filter. Although the cosine function has a periodicity, the pulse compression filter connected in cascade with the weighting transducer allows only one period of the spectral response function 30 between successive minimum points to be considered. That is, dashed line portions 31, 32 of the response 30 revert to zero when multiplied by the substantially rectangular output response of the pulse compression filter of the radar system being weighted.

Next, the Fourier transform of the frequency domain response 30 produces the time domain response, $h(t)$, which constitutes a unit impulse 33 bracketed by two impulses 34, 35 spaced $1/B$ from impulse 33 and of an amplitude equal to $1/2 (1-a)/1+a$ where $a$ is the normalized height of the pedestal. Although the normalized height can vary from zero to one, it is set equal to 0.08 for the Hamming function making the amplitude of the impulses 34, 35 approximately equal to 0.42.

Figure 3:
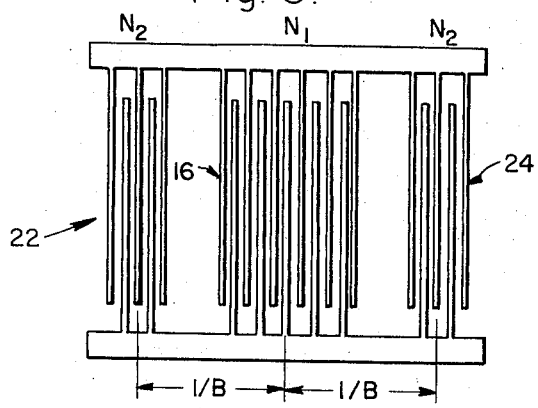
FIG. 3 illustrates a surface wave transducer for implementing the "Hamming" function.
Figure 4:
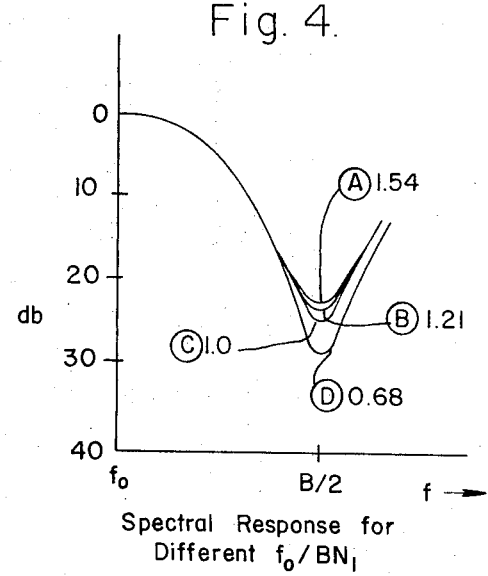
FIG. 4 illustrates the effect of different numbers of sources in the respective arrays of a periodic unapodized transducer having a cosine-on-a-pedestal spectral response approximately the Hamming function.

According to the present invention, the weighting transducer for the Hamming function is provided by selecting a ratio of the number, $N_2$, of sources in each of the transducers 22, 24 to the number, $N_1$, of sources in the transducer 16 equal to 0.42, choosing $N_1$ and $N_2$ to be either odd or even, and spacing the respective centers of the transducers 22, 16 and 24 to produce a delay of $1/B$ therebetween. Referring to FIG. 3, this is approximated by setting $N_1 = 10$ and $N_2 = 4$ whereby the ratio $2/N_1 = 0.4$. Lastly, the number of sources in the arrays 16, 22, 24 must be sufficiently small so that the bandwidth thereof is large compared to the filter bandwidth, B. An indication of this is given by relation (1) wherein $f_o/B\ N_1 \geq 1$. Referring to FIG. 4, there is illustrated the affect of various magnitudes of $f_o/B\ N_1$ on the actual weighting function. In FIG. 4, the characteristics A, B, C and D are for the ratio $f_o/B\ N_1$ equal to 1.54, 1.21, 1.0 and 0.68, respectively. The characteristic A essentially corresponds to the desired Hamming function. It is apparent that characteristics A, B and C approximate the Hamming function, $H(f)$ fairly closely whereas characteristic D deviates substantially from the desired Hamming function. Thus, in approximating the impulse response, $h(t)$, it is desirable to select the ratio $f_o/B\ N_1$ to be greater than or equal to one.

What is claimed is:

1. A surface wave transducer adapted to provide weighting for a pulse compression filter of bandwidth, B, with a mean frequency, $f_o$, said transducer having a frequency domain spectral response, $H(f)$, which has a time domain impulse response, $h(t)$, including a center impulse and first and second equal flanking impulses spaced $1/B$ therefrom and of an amplitude that is predetermined fraction less than one of the amplitude of said center impulse, said surface wave transducer comprising;
   a. means for providing a piezoelectric substrate;
   b. first and second spaced parallel electrical pads disposed coextensively on said substrate;
   c. means including ($m+1$) finger-shaped electrodes of a predetermined length spaced one-half wavelength, at said frequency, $f_o$, along said substrate and connected to said first and second electrical pads for providing a central electro-acoustic transducer having $m$ sources where $m$ is a positive integer no less than three; and
   d. means disposed on each side of said central electro-acoustic transducer each including no more than ($n+1$) finger-shaped electrodes of said predetermined length spaced one-half wavelength at said frequency, $f_o$, along said substrate and connected to said first and second electrical pads for providing first and second flanking electro-acoustic transducers each having $n$ sources where $n$ is a positive integer no less than one, said first and second electro-acoustic transducers being spaced a predetermined distance from said central transducer equivalent to introducing a delay equal to $1/B$ between the respective centers thereof, $n/m$ being substantially equal to said predetermined fraction and m and n both being odd or both being even.

2. The surface wave transducer adapted to provide weighting for a pulse compression filter as defined in claim 1 wherein the quantity $f_o/Bm$ is no less than one.

3. The surface wave transducer adapted to provide weighting for a pulse compression filter as defined in claim 1 wherein said first and second electrical pads additionally include pedestal-shaped electrical pads coextensive with the respective widths of said central and said first and second flanking electro-acoustic transducers.

4. A surface wave transducer adapted to provide cosine-on-a-pedestal weighting over a bandwidth B having a mean frequency, $f_o$, where the peak of the cosine-on-a-pedestal function is normalized at 1 and the lowest points thereof and designated $a$ whereby $a$ is greater than zero and less than one, said surface wave transducer comprising:
   a. means for providing a piezoelectric substrate;
   b. first and second spaced parallel longitudinal electrical pads disposed coextensively on said substrate;
   c. means including ($m+1$) finger-shaped electrodes of a predetermined length spaced one-half wavelength, at said frequency, $f_o$, along said substrate and connected to said first and second electrical pads for providing a central electro-acoustic transducer having m sources where $m$ is a positive integer no less than three; and
   d. means disposed on opposite sides of said central electro-acoustic transducer each including no more than ($n+1$) finger-shaped electrodes of said predetermined length spaced one-half wavelength at said frequency, $f_o$, along said substrate and connected to said first and second electrical pads for providing first and second electro-acoustic transducers each having $n$ sources where $n$ is a positive integer no less than one, said first and second electro-acoustic transducers being spaced a predetermined distance from said central transducer equivalent to introducing a delay equal to $1/B$ between the respective centers thereof, $n/m$ being substantially equal to $1/2 (1-a/1+a)$ where $m$ and $n$ are both odd or both even.

5. The surface wave transducer as defined in claim 4 wherein the quantity $f_o/Bm$ is no less than one.

6. The surface wave transducer as defined in claim 4 wherein $1/2 (1-a/1+a) \approx 0.42$ and the quantity $f_o/Bm$ is no less than one.

* * * * *